United States Patent
Tomoda

(10) Patent No.: US 10,344,669 B2
(45) Date of Patent: Jul. 9, 2019

(54) VARIABLE COMPRESSION RATIO MECHANISM AND INTERNAL COMBUSTION ENGINE

(71) Applicant: TOYOTA JIDOSHA KABUSHIKI KAISHA, Toyota-shi, Aichi-ken (JP)

(72) Inventor: Keiju Tomoda, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/866,575

(22) Filed: Jan. 10, 2018

(65) Prior Publication Data
US 2018/0245508 A1 Aug. 30, 2018

(30) Foreign Application Priority Data
Feb. 28, 2017 (JP) ................................. 2017-037294

(51) Int. Cl.
| | |
|---|---|
| F02B 75/04 | (2006.01) |
| F01B 31/14 | (2006.01) |
| F02D 15/02 | (2006.01) |
| F16C 7/06 | (2006.01) |
| F16K 31/524 | (2006.01) |
| F16C 3/28 | (2006.01) |

(52) U.S. Cl.
CPC ............ *F02B 75/045* (2013.01); *F01B 31/14* (2013.01); *F02D 15/02* (2013.01); *F16C 3/28* (2013.01); *F16C 7/06* (2013.01); *F16K 31/52483* (2013.01); *F16C 2360/22* (2013.01)

(58) Field of Classification Search
CPC ........ F02B 75/045; F01B 31/14; F02D 15/02; F16C 3/28; F16K 31/52483

USPC ............................................ 123/48 B, 78 BA
See application file for complete search history.

(56) References Cited

U.S. PATENT DOCUMENTS

| | | | | |
|---|---|---|---|---|
| 5,562,068 A | * | 10/1996 | Sugimoto | ............. F02B 75/045 123/197.4 |
| 2013/0118454 A1 | * | 5/2013 | Woo | ........................ F02D 15/02 123/48 B |
| 2014/0123957 A1 | * | 5/2014 | Woo | ....................... F02B 75/045 123/48 B |

(Continued)

FOREIGN PATENT DOCUMENTS

| | | |
|---|---|---|
| JP | 2011-196549 | 10/2011 |
| WO | WO 2014/019683 A1 | 2/2014 |
| WO | WO 2016-037696 A1 | 3/2016 |

*Primary Examiner* — Marguerite J McMahon
(74) *Attorney, Agent, or Firm* — Finnegan, Henderson, Farabow, Garrett & Dunner, LLP

(57) ABSTRACT

The variable compression ratio mechanism 1, 1' comprises: a connecting rod 20 provided with a crank receiving opening 23; an eccentric member 30, 30' provided with a piston pin receiving opening 36 and attached to the connecting rod to be able to turn so as to change a length between a center axial line of the piston pin receiving opening and a center axial line of the crank receiving opening; a swing member 40, 50, 40' attached to the connecting rod to be able to swing and able to engage with the eccentric member; and an actuating member 60, 60' swinging the swing member from an initial position toward a stop position. The swing member engages with the eccentric member to turn the eccentric member when swinging from the initial position toward the stop position, and returns from the stop position to the initial position when disengaged form the eccentric member.

11 Claims, 15 Drawing Sheets

(56) References Cited

U.S. PATENT DOCUMENTS

2015/0233288 A1* 8/2015 Paul .................. F02B 75/045
                                                    123/48 B
2015/0260094 A1 9/2015 Wittek

* cited by examiner

VARIABLE COMPRESSION RATIO MECHANISM AND INTERNAL COMBUSTION ENGINE

TECHNICAL FIELD

The present invention relates to a variable compression ratio mechanism and an internal combustion engine.

BACKGROUND ART

Known in the past has been an internal combustion engine comprising a variable compression ratio mechanism which can change a mechanical compression ratio of the internal combustion engine. As such a variable compression ratio mechanism, various mechanisms have been proposed. As one among these, one which can change the effective length of a connecting rod used in the internal combustion engine may be mentioned (for example, PTLs 1 to 3). In this regard, the "effective length of a connecting rod" means the length between a center axial line of a crank receiving opening which receives a crank pin and a center axial line of a piston pin receiving opening which receives a piston pin. Therefore, if the effective length of a connecting rod becomes longer, a combustion chamber volume when the piston is at top dead center of the compression stroke becomes smaller, and therefore the mechanical compression ratio increases. On the other hand, if the effective length of a connecting rod becomes shorter, the combustion chamber volume when the piston is at top dead center of the compression stroke becomes larger, and therefore the mechanical compression ratio falls.

As a variable length connecting rod which can be changed in effective length, known is one which is provided with a connecting rod body with a small diameter end part on which an eccentric member, which can turn with respect to the connecting rod body, is provided (for example, PTLs 1 to 3). The eccentric member has a piston pin receiving opening which receives the piston pin. The piston pin receiving opening is provided so as to offset with respect to a turning center of the eccentric member. In such a variable length connecting rod, if changing the turning position of the eccentric member, the effective length of the connecting rod can be changed accordingly.

In the variable length connecting rod described in PLTs 1 and 2, the effective length of the connecting rod is changed by using a hydraulic piston mechanism provided at the connecting rod body to turn an eccentric member. In such a variable length connecting rod, the flow of hydraulic oil to the hydraulic piston mechanism is switched so as to control the turning of the eccentric member.

CITATION LIST

Patent Literature

PLT 1: WO2014/019683A
PLT 2: Japanese Patent Publication No. 2011-196549A
PLT 3: WO2016/037696A

SUMMARY OF INVENTION

Technical Problem

However, if turning the eccentric member using hydraulic oil, the following problems occur. The temperature of the hydraulic oil stored in the internal combustion engine fluctuates depending on the operation condition of the internal combustion engine, the outside air temperature, etc. When the temperature of the hydraulic oil is low, the viscosity of the hydraulic oil becomes high, and when the temperature of the hydraulic oil is high, the viscosity of the hydraulic oil becomes low. Therefore, the lower the temperature of the hydraulic oil, the longer the time required for the hydraulic oil to move between the pistons, and thus the longer the time required to change the effective length of the connecting rod. Accordingly, in the method of turning the eccentric member using the hydraulic oil, the variation in the response time when changing the mechanical compression ratio of the internal combustion engine by changing the effective length of the connecting rod becomes large, and it is difficult to obtain the desired response time.

Therefore, in view of the above problem, an object of the present invention is to provide a variable compression ratio mechanism capable of reducing the variation in response time when changing the mechanical compression ratio of the internal combustion engine.

Solution to Problem

The summary of the present disclosure is as follows.

(1) A variable compression ratio mechanism able to change a mechanical compression ratio of an internal combustion engine, comprising: a connecting rod provided with a crank receiving opening receiving a crank pin; an eccentric member provided with a piston pin receiving opening receiving a piston pin and attached to the connecting rod to be able to turn so as to change a length between a center axial line of the piston pin receiving opening and a center axial line of the crank receiving opening; a swing member attached to the connecting rod to be able to swing and able to engage with the eccentric member; and an actuating member configured so as to swing the swing member from an initial position toward a stop position, wherein the swing member engages with the eccentric member to turn the eccentric member when swinging from the initial position toward the stop position, and returns from the stop position to the initial position when disengaged form the eccentric member.

(2) The variable compression ratio mechanism described in above (1), wherein the swing member is comprised of a first swing arm configured so as to turn the eccentric member in one direction and a second swing arm configured so as to turn the eccentric member in the other direction.

(3) The variable compression ratio mechanism described in above (2), wherein the eccentric member has three or more projections engaging with the swing member, and the mechanical compression ratio of the internal combustion engine is changed in three or more stages.

(4) The variable compression ratio mechanism described in above (1), wherein the swing member is comprised of a single swing arm configured so as to turn the eccentric member in one direction.

(5) The variable compression ratio mechanism described in any one of above (1) to (4), further comprising a lock member configured so as to lock against turning of the eccentric member when the eccentric member is not engaged with the swing member.

(6) The variable compression ratio mechanism described in above (5), wherein the swing member contacts the lock member to unlock turning of the eccentric member when swinging from the initial position toward the stop position.

(7) The variable compression ratio mechanism described in any one of above (1) to (6), wherein the swing member is formed with a guide groove, the actuating member includes a guide pin, and when the crank pin turns, the guide pin engages with the guide groove and is guided in the guide groove to swing the swing member from the initial position to the stop position.

(8) The variable compression ratio mechanism described in above (7), further comprising a biasing member biasing the swing member from the stop position toward the initial position, wherein the swing member returns from the stop position to the initial position in the state with the guide pin engaged with the guide groove when disengaged from the eccentric member, and the guide groove is formed so as to reduce a biasing force of the biasing member when the swing member returns from the stop position to the initial position.

(9) The variable compression ratio mechanism described in any one of above (1) to (8), wherein the actuating member includes a moving member moving between a contact position contacting the swing member and a noncontact position not contacting the swing member, and a control member controlling movement of the moving member.

(10) The variable compression ratio mechanism described in above (9), wherein there are two or more connecting rods and moving members, each moving member is provided around each connecting rods, and the moving members move integrally.

(11) An internal combustion engine provided with a variable compression ratio mechanism according to any one of claims 1 to 10.

Advantageous Effects of Invention

According to the present invention, there is provided a variable compression ratio mechanism capable of reducing the variation in response time when changing the mechanical compression ratio of the internal combustion engine.

DESCRIPTION OF EMBODIMENTS

Figure 1:
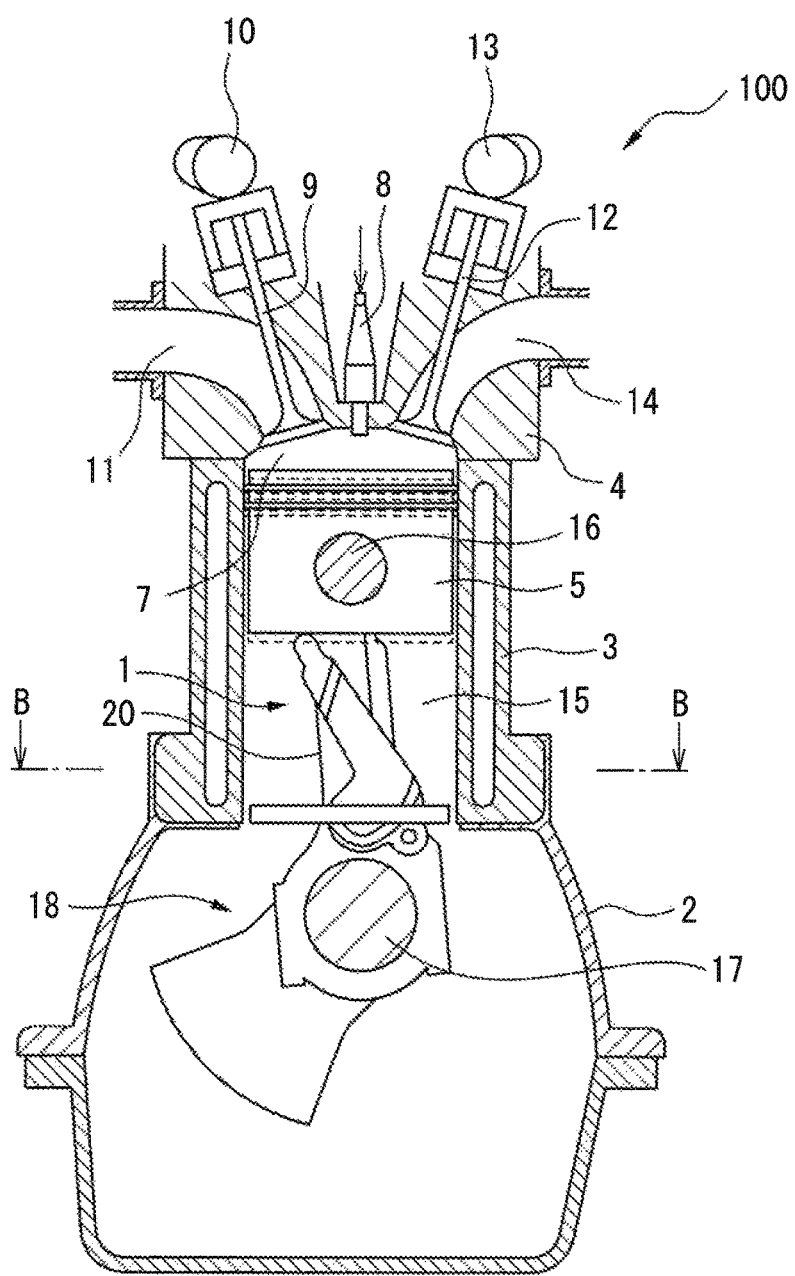
FIG. 1 is a schematic cross-sectional view of an internal combustion engine provided with a variable compression ratio mechanism according to a first embodiment of the present invention.

Below, referring to the drawings, embodiments of the present invention will be explained in detail. Note that, in the following explanation, similar components are assigned the same reference numerals.

First Embodiment

First, referring to FIG. 1 to FIG. 13, a variable compression ratio mechanism according to a first embodiment of the present invention will be explained.

Internal Combustion Engine

FIG. 1 is a schematic cross-sectional view of an internal combustion engine 100 provided with a variable compression ratio mechanism 1 according to a first embodiment of the present invention. The internal combustion engine 100 is provided with a crankcase 2, cylinder block 3, cylinder head 4, piston 5, spark plug 8, intake valve 9, intake camshaft 10, intake port 11, exhaust valve 12, exhaust camshaft 13, and exhaust port 14. Between the cylinder head 4 and the piston 5, a combustion chamber 7 is formed. The cylinder block 3 defines a cylinder 15. The piston 5 moves back and forth inside the cylinder 15 in the axial direction of the cylinder 15. In the present embodiment, there are four cylinders. Note that, the specific configuration of the internal combustion engine 100 such as the number of cylinders, the cylinder array, and configurations of the intake and exhaust systems may differ from the configuration shown in FIG. 1.

Variable Compression Ratio Mechanism

Figure 2:
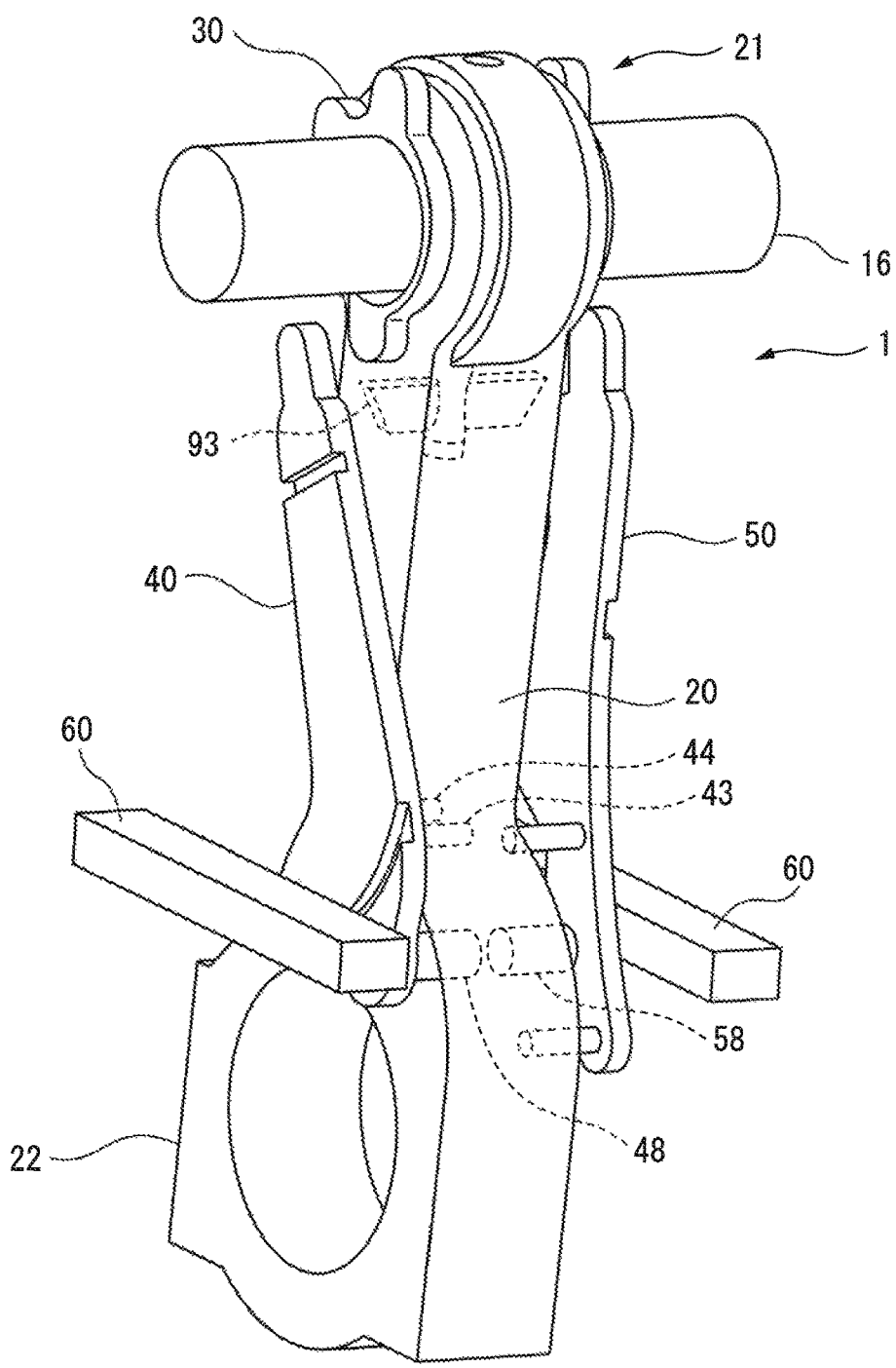
FIG. 2 is a perspective view schematically showing the variable compression ratio mechanism according to the first embodiment of the present invention.
Figure 3:
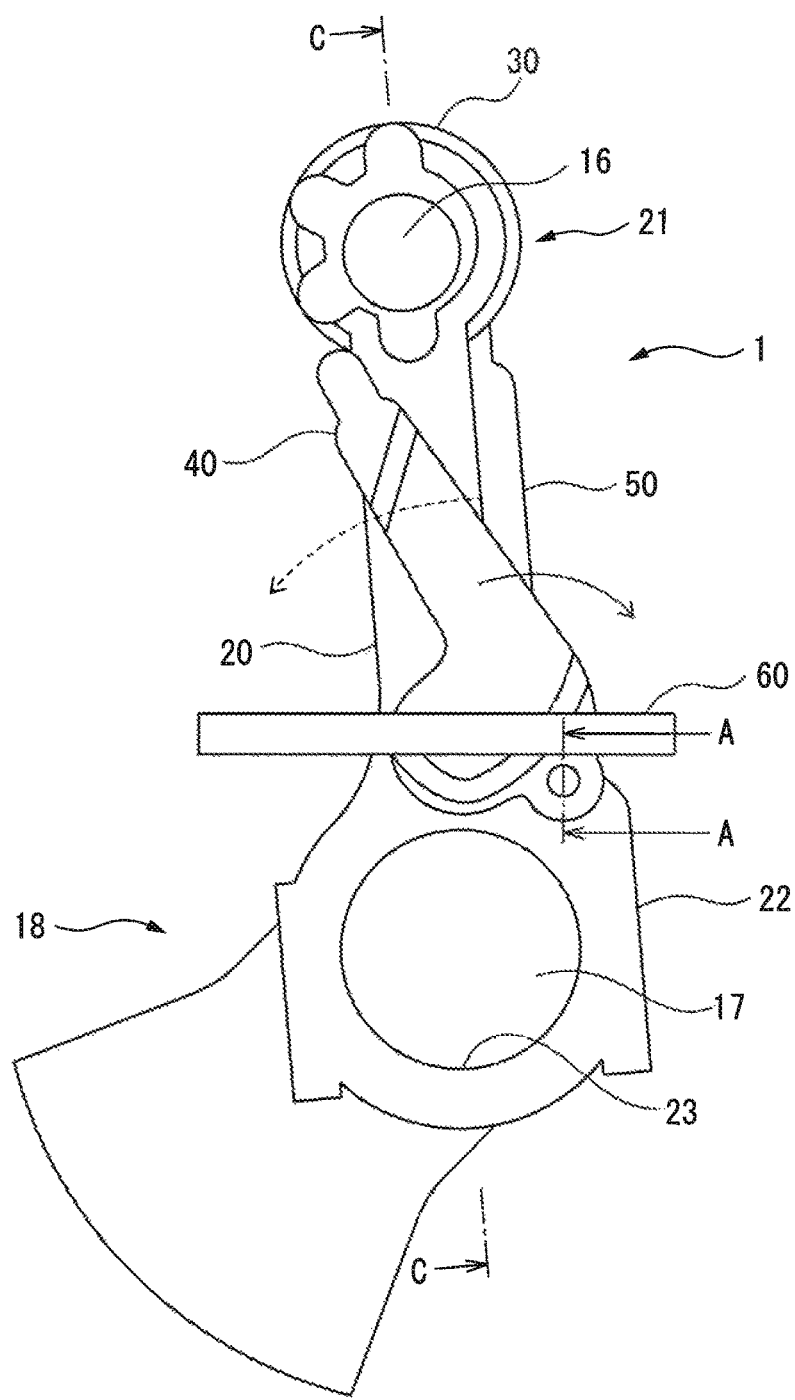
FIG. 3 is a front view schematically showing the variable compression ratio mechanism according to the first embodiment of the present invention.

The internal combustion engine 100 is further provided with a variable compression ratio mechanism 1 able to change the mechanical compression ratio of the internal combustion engine 100. FIG. 2 is a perspective view schematically showing the variable compression ratio mechanism 1 according to the first embodiment of the present invention. In FIG. 2, parts not visible from the outside are shown by broken lines. FIG. 3 is a front view schematically showing the variable compression ratio mechanism 1 according to the first embodiment of the present invention.

The variable compression ratio mechanism 1 is provided with a connecting rod 20, an eccentric member 30 attached to the connecting rod 20 to be able to turn, a swing member attached to the connecting rod 20 to be able to swing, and an actuating member 60 configured so as to swing the swing member. In the present embodiment, the swing member is comprised of a first swing arm 40 configured to so as to turn the eccentric member 30 in one direction and a second swing arm 50 configured so as to turn the eccentric member 30 in the other direction.

The connecting rod 20 is connected at a small end 21 through a piston pin 16 to the piston 5 and is connected at a big end 22 to a crank pin 17 of a crankshaft 18. The variable compression ratio mechanism 1 changes the length between an axial line of the piston pin 16 and an axial line of the crank pin 17, that is, an effective length of the connecting rod 20, to thereby change the mechanical compression ratio of the internal combustion engine 100.

Specifically, the variable compression ratio mechanism 1 uses the first swing arm 40 to turn the eccentric member 30 in one direction (counterclockwise in FIG. 3) to thereby increase the effective length of the connecting rod 20. When the effective length of the connecting rod 20 becomes longer, the length from the piston pin 16 to the crank pin 17 becomes longer, and therefore the volume inside the combustion chamber 7 when the piston 5 is at top dead center becomes smaller, as shown by the solid line in FIG. 1. On the other hand, even if the effective length of the connecting rod 20 changes, the stroke length by which the piston 5 moves back and forth inside the cylinder 15 does not change. Therefore, when the effective length of the connecting rod 20 becomes longer, the mechanical compression ratio of the internal combustion engine 100 becomes higher.

Further, the variable compression ratio mechanism 1 uses the second swing arm 50 to turn the eccentric member 30 in the other direction (clockwise in FIG. 3) to thereby shortens the effective length of the connecting rod 20. When the effective length of the connecting rod 20 becomes shorter, the length from the piston pin 16 to the crank pin 17 becomes shorter, and therefore the volume of the combustion chamber 7 when the piston 5 is at top dead center becomes larger, as shown by the broken line in FIG. 1. On the other hand, as explained above, the stroke length of the piston 5 is constant. Therefore, when the effective length of the connecting rod 20 becomes shorter, the mechanical compression ratio of the internal combustion engine 100 becomes lower. Below, the various components of the variable compression ratio mechanism 1 will be explained in detail.

Connecting Rod

First, the connecting rod 20 will be explained. One connecting rod 20 is provided for each of the cylinders 15 of the internal combustion engine 100. In the present embodiment, there are four connecting rods 20. Each connecting rod 20 has the big end 22 where a crank receiving opening 23 for receiving a crank pin 17 is provided and the small end 21 where an eccentric member receiving opening for receiving the eccentric member 30 is provided. The small end 21 is arranged at the piston 5 side and is positioned at the opposite side to the big end 22. Note that, the crank receiving opening 23 is larger than the eccentric member receiving opening, so the end part of the connecting rod 20 at the side where the crank receiving opening 23 is provided is referred to as the "big end 22", while the end part of the connecting rod 20 at the side where the eccentric member receiving opening is provided is referred to as the "small end 21".

In this Description, the line extending through the center axial line of the crank receiving opening 23 (that is, the axial line of the crank pin 17) and the center axial line of the eccentric member receiving opening (that is, the axial line of the eccentric member 30), that is, the line passing through the center of the connecting rod 20, will be referred to as the "axial line of the connecting rod 20". Further, the length of the connecting rod 20 in a direction vertical to the axial line of the connecting rod 20 and vertical to the center axial line of the crank receiving opening 23 will be referred to as the "width of the connecting rod 20". In addition, the length of the connecting rod 20 in a direction parallel to the center axial line of the crank receiving opening 23 will be referred to as the "thickness of the connecting rod 20".

Eccentric Member

Figure 4:
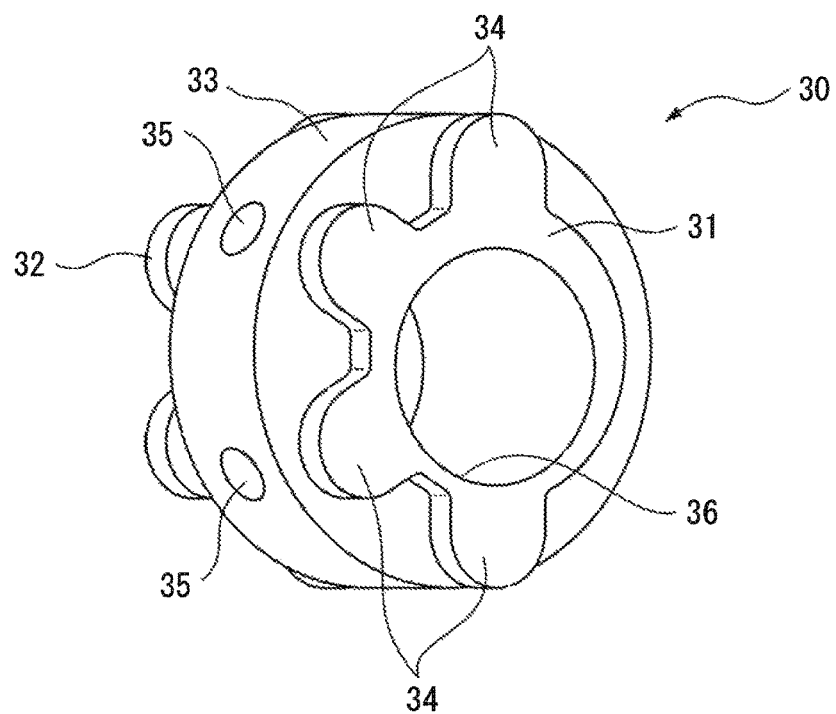
FIG. 4 is a perspective view of an eccentric member.
Figure 5:
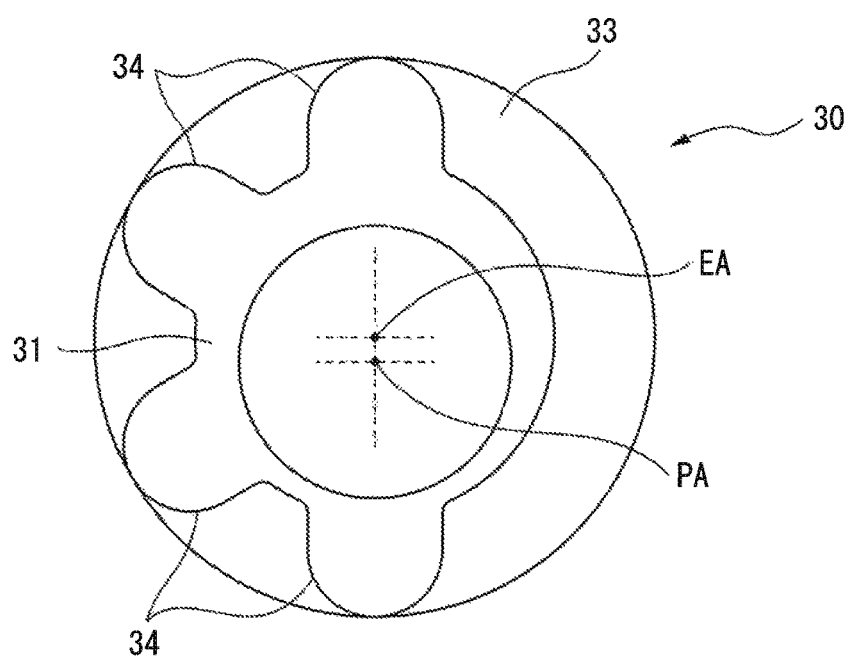
FIG. 5 is a front view of the eccentric member.

Next, the eccentric member 30 will be explained. FIG. 4 is a perspective view of the eccentric member 30, while FIG. 5 is a front view of the eccentric member 30. The eccentric member 30 includes a first engaged part 31, second engaged part 32, and lock part 33 arranged between the first engaged part 31 and the second engaged part 32. The eccentric member 30 is provided with a piston pin receiving opening 36 receiving the piston pin 16. The piston pin receiving opening 36 is formed into a cylindrical shape and runs through the eccentric member 30 in the axial direction.

The first engaged part 31 has four projections 34. The four projections 34 extend from the piston pin receiving opening 36 to the outside in the diametrical direction. The tips of the projections 34 are rounded. The projections 34 are arranged at the outside of the connecting rod 20 in the thickness direction of the connecting rod 20. The projections 34 engage with the first swing arm 40. As will be understood from FIG. 5, the projections 34 are arranged at equal intervals around the axial line EA of the eccentric member 30. In this example, the interval between the projections is 60°. Further, the projections 34 are arranged over half of the outer circumference of the eccentric member 30.

The first engaged part 31 is connected to the lock part 33 in the axial direction of the eccentric member 30. The connecting part of the first engaged part 31 with the lock part 33 is received in the eccentric member receiving opening of the connecting rod 20. The second engaged part 32 has a shape similar to the first engaged part 31. The second engaged part 32 is connected to the lock part 33 in the axial direction of the eccentric member 30. The connecting part of the second engaged part 32 with the lock part 33 is received in the eccentric member receiving opening of the connecting rod 20.

The lock part 33 has a cylindrical shape. The lock part 33 is inserted into the small end 21 of the connecting rod 20. The lock part 33 is formed with four lock holes 35. The four lock holes 35 respectively extend from the outer surface of the lock part 33 to the inside in the diametrical direction. The lock holes 35 are arranged in the circumferential direction of the eccentric member 30 at the same positions as the projections 34. Lock pins 91 of the lock member 90 described later are inserted into the lock holes 35.

The eccentric member 30 can turn with respect to the small end 21 about the axial line EA. Therefore, the axial line EA of the eccentric member 30 matches with the center of turning of the eccentric member 30. Further, the piston pin receiving opening 36 is formed so that the center axial line PA of the piston pin receiving opening 36 is parallel with the axial line EA of the eccentric member 30, but not coaxial. Therefore, the center axial line PA of the piston pin receiving opening 36 is offset from the axial line EA of the eccentric member 30, that is, the center of turning of the eccentric member 30.

For this reason, if the eccentric member 30 turns, the position of the center axial line PA of the piston pin receiving opening 36 with respect to the axial line EA of the eccentric member 30 changes. When the position of the center axial line PA of the piston pin receiving opening 36 is at the big end 22 side, the length between the center axial line PA of the piston pin receiving opening 36 and the center axial line of the crank receiving opening 23, that is, the effective length of the connecting rod 20, becomes shorter. On the other hand, when the position of the center axial line PA of the piston pin receiving opening 36 is at the opposite side from the big end 22 side, that is, is at the small end 21 side, the effective length of the connecting rod 20 becomes longer. Therefore, by turning the eccentric member 30, the effective length of the connecting rod 20 can be changed. That is, the eccentric member 30 is attached to the connecting rod 20 to be able to turn so as to change the effective length of the connecting rod 20.

Swing Member

Next, the swing member will be explained. As explained above, the swing member is comprised of the first swing arm 40 configured so as to turn the eccentric member 30 in one direction and the second swing arm 50 configured so as to turn the eccentric member 30 in the other direction. The first swing arm 40 and the second swing arm 50 are arranged so as to sandwich the connecting rod 20 in the thickness direction of the connecting rod 20.

Figure 6:
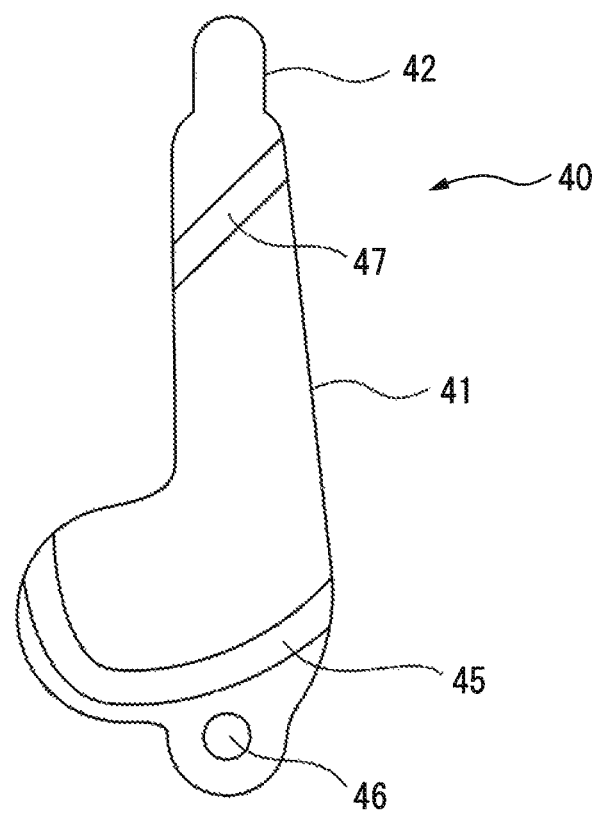
FIG. 6 is a front view of a first swing arm.

FIG. 6 is a front view of the first swing arm 40. The first swing arm 40 includes a main body 41 and an engaging part 42 positioned at the front end of the main body 41. The tip of the engaging part 42 is rounded. The swing member can engage with the eccentric member 30. The engaging part 42 of the first swing arm 40 engages with the projections 34 of the eccentric member 30. Further, as shown in FIG. 2, the first swing arm 40 further includes a first support pin 43, a first stopper pin 44, and a first fulcrum pin 48 extending from the main body 41 to the inside of the connecting rod 20.

As shown in FIG. 6, the main body 41 is formed with a guide groove 45 for engaging with a first guide pin 65 of the later explained actuating member 60. The guide groove 45 is curved and runs through the main body 41 in the short direction of the main body. Further, the main body 41 is formed with a pin hole 46 for receiving the first fulcrum pin 48. The first fulcrum pin 48 is press-fit into the pin hole 46. The first fulcrum pin 48 is a swing fulcrum of the first swing arm 40 and can turn inside the connecting rod 20. Note that, the first fulcrum pin 48 may be fastened to the main body 41 by welding etc. In this case, the pin hole 46 may be omitted. Further, the main body 41 is formed with a pin passing groove 47 through which the first guide pin 65 of the actuating member 60 passes when the crank pin 17 turns.

The first swing arm 40 and the second swing arm 50 swing from their initial positions toward the stop positions when turning the eccentric member 30. The first swing arm 40 and the second swing arm 50 are opposite in swing directions. In FIG. 3, the swing direction of the first swing arm 40 is shown by the solid line arrow, while the swing direction of the second swing arm 50 is shown by the broken line arrow.

Figure 7:
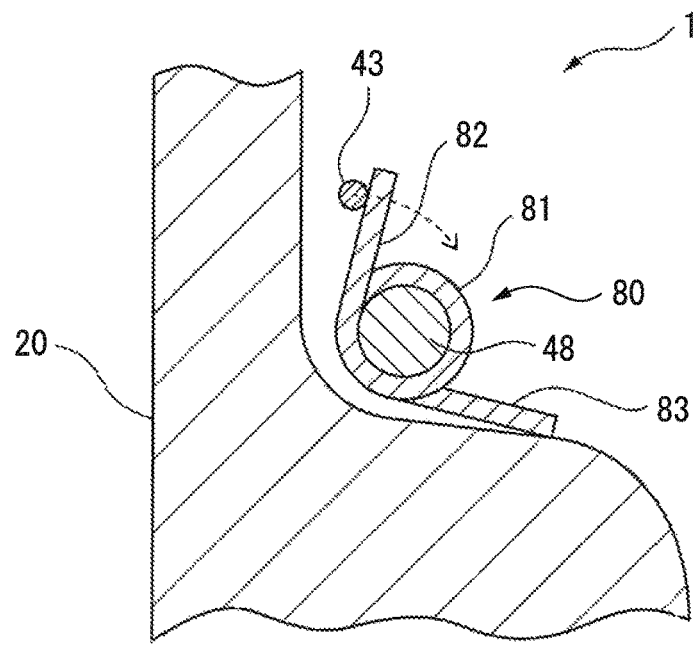
FIG. 7 is a partial front cross-sectional view of the variable compression ratio mechanism.

The variable compression ratio mechanism 1 is further provided with a first biasing member biasing the first swing arm 40 from the stop position toward the initial position and a second biasing member biasing the second swing arm 50 from the stop position toward the initial position. The first biasing member and the second biasing member are arranged inside the connecting rod 20. FIG. 7 is a partial front cross-sectional view of the variable compression ratio mechanism 1. FIG. 7 schematically shows the situation where the first biasing member biases the first swing arm 40. In FIG. 7, the first swing arm 40 is positioned at the initial position. The path when the first swing arm 40 swings from the initial position toward the stop position is shown by the broken line arrow.

In the present embodiment, the first biasing member is a torsion spring (torsion coil spring) 80. The torsion spring 80 includes a coil part 81 and a first arm part 82 and second arm part 83 extending from the coil part 81. The coil part 81 is arranged around the first fulcrum pin 48. The first arm part 82 is supported by the first support pin 43 of the first swing arm 40, while the second arm part 83 is supported by the connecting rod 20. The torsion spring 80 biases the first swing arm 40 from the stop position toward the initial position (direction opposite to broken line in FIG. 7). Note that, the first biasing member may be another biasing member such as a compression coil spring.

The first stopper pin 44 restricts the swing range of the first swing arm 40 when biased by the first biasing member. Therefore, the first stopper pin 44 determines the initial position of the first swing arm 40. Note that, when the swing range of the first swing arm 40 can be restricted by the first support pin 43 etc., the first stopper pin 44 may be omitted.

The second biasing member has a configuration similar to the first biasing member. However, the second swing arm 50 swings in the opposite direction from the first swing arm 40 when swinging from the initial position toward the stop position, so the biasing directions of the first biasing member and second biasing member are opposite.

Figure 8:
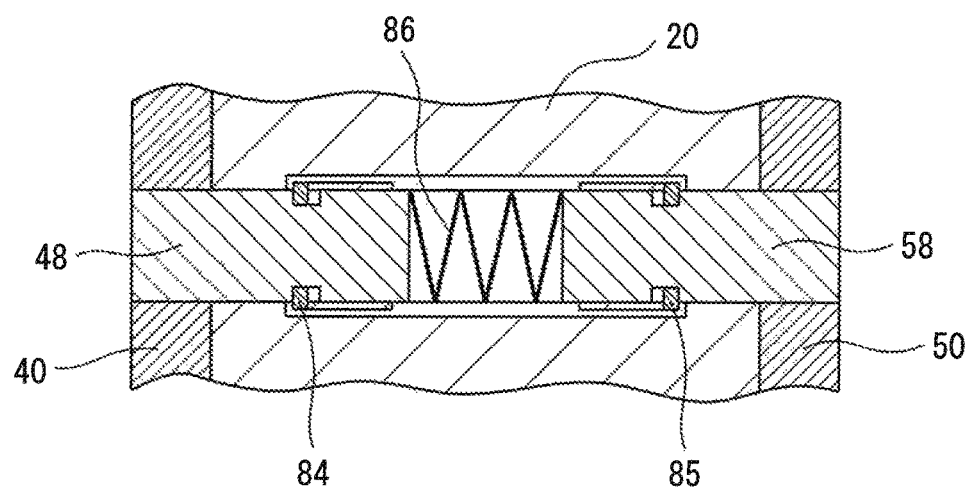
FIG. 8 is a schematic partial cross-sectional view of the variable compression ratio mechanism along the line A-A of FIG. 3.

FIG. 8 is a schematic partial cross-sectional view of the variable compression ratio mechanism 1 along the line A-A of FIG. 3. The variable compression ratio mechanism 1 is further provided with a fulcrum pin biasing member 86. The fulcrum pin biasing member 86 biases the first swing arm 40 through the first fulcrum pin 48 and biases the second swing arm 50 through a second fulcrum pin 58. The fulcrum pin biasing member 86 is arranged inside the connecting rod 20 and is arranged between the first fulcrum pin 48 and the second fulcrum pin 58. The fulcrum pin biasing member 86 biases the first fulcrum pin 48 and the second fulcrum pin 58 to the outside of the connecting rod 20 in the thickness direction of the connecting rod 20. In this embodiment, the fulcrum pin biasing member 86 is a compression coil spring.

The first fulcrum pin 48 and second fulcrum pin 58 are, respectively, formed with a first circumferential groove and a second circumferential groove extending in the circumferential directions. At the first circumferential groove and the second circumferential groove, respectively, a first stopper member 84 and a second stopper member 85 are arranged. The first stopper member 84 enables turning of the first fulcrum pin 48 while restricting movement of the first fulcrum pin 48 in the thickness direction of the connecting rod 20. The first stopper member 84 moves together with the first fulcrum pin 48 in the thickness direction of the connecting rod 20. Similarly, the second stopper member 85 enables turning of the second fulcrum pin 58 while restricting movement of the second fulcrum pin 58 in the thickness direction of the connecting rod 20. The second stopper member 85 moves together with the second fulcrum pin 58 in the thickness direction of the connecting rod 20.

The second swing arm 50 has a shape similar to the first swing arm 40 and is configured so as to swing in the opposite direction from the first swing arm 40 when swinging from the initial position toward the stop position.

Actuating Member

Figure 9:
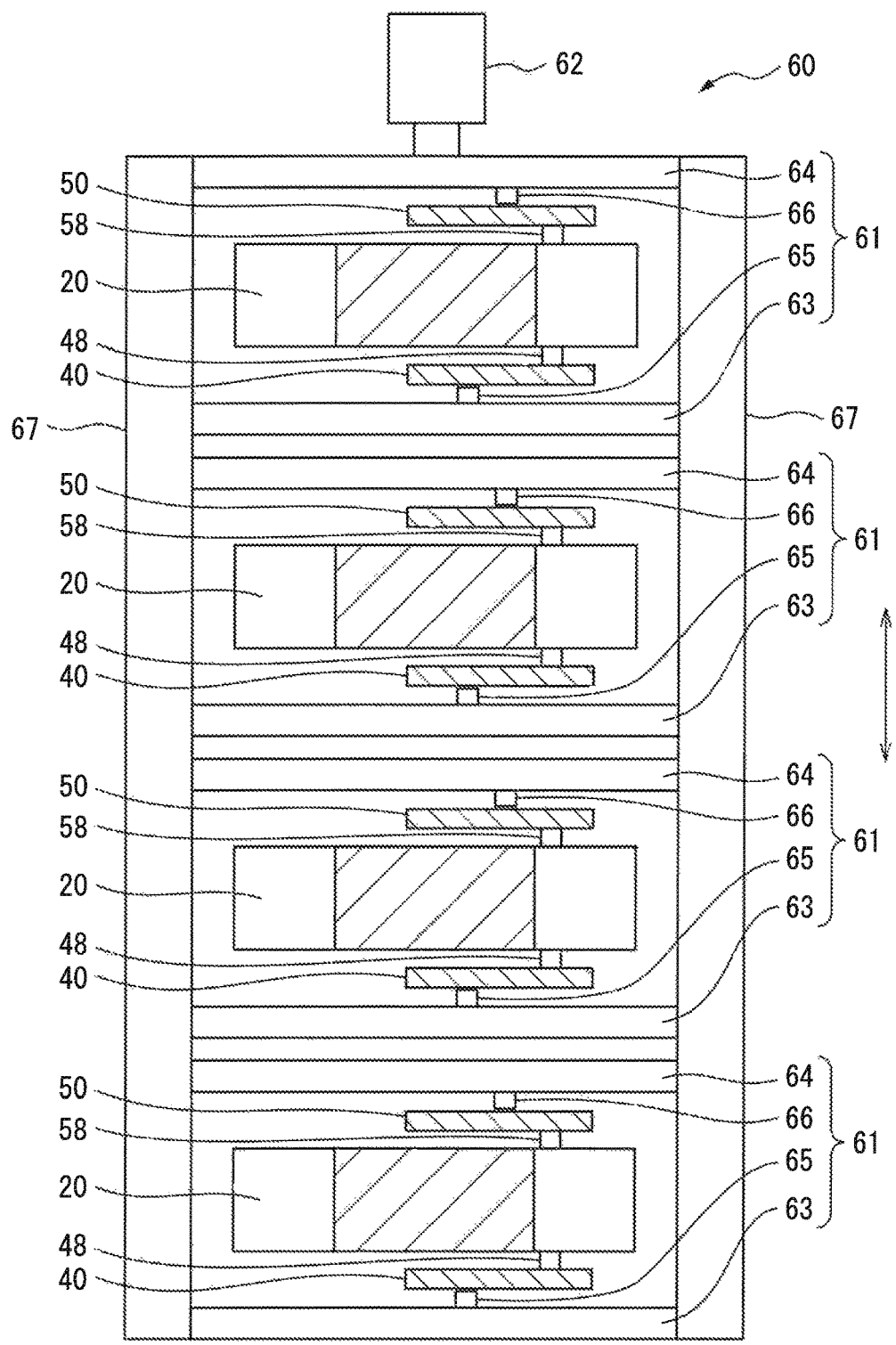
FIG. 9 is a schematic cross-sectional view of the variable compression ratio mechanism along the line B-B of FIG. 1.

Next, the actuating member 60 will be explained. The actuating member 60 is provided inside the cylinder block 3 and swings the swing member from its initial position toward the stop position. FIG. 9 is a schematic cross-sectional view of the variable compression ratio mechanism 1 along the line B-B of FIG. 1. In FIG. 9, the cylinder block 3 and crankcase 2 are omitted. The actuating member 60 includes moving members 61 and a control member 62 for controlling movement of the moving member 61.

The moving member 61 moves between a contact position contacting the swing member and a noncontact position not contacting the swing member. The moving member 61 includes a first beam member 63, a second beam member 64, the first guide pin 65 extending from the first beam member 63 toward the first swing arm 40, and a second guide pin 66 extending from the second beam member 64 toward the second swing arm 50. Each moving member 61 is provided around each connecting rod 20. The moving members 61 are connected with each other by a frame member 67. For this reason, the moving members 61 provided around the connecting rods 20 move integrally.

The control member 62 is arranged in the thickness direction of the connecting rod 20 at a one end part of the plurality of moving members 61. The tip of the control member 62 is fastened to a moving member 61. The control member 62 extends and contracts in the thickness direction of the connecting rod 20 to thereby move the moving members 61 in the thickness direction of the connecting rod 20. In FIG. 9, the movement direction of the moving members 61 is shown by the arrows. The control member 62, for example, is an electrically controlled push-pull solenoid. Note that, the control member 62 may be a part controlled by hydraulics etc. Further, the control member 62 may be arranged at the other end or both ends of the plurality of moving members 61 in the thickness direction of the connecting rod 20.

If the first beam member 63 is moved by the control member 62 toward the first swing arm 40, it pushes the first swing arm 40 toward the connecting rod 20. If the first guide pin 65 is moved by the control member 62 toward the first swing arm 40, due to turning of the crank pin 17, it engages with the guide groove 45 of the first swing arm 40. On the other hand, if the second beam member 64 is moved by the control member 62 toward the second swing arm 50, it pushes the second swing arm 50 toward the connecting rod 20. If the second guide pin 66 is moved by the control member 62 toward the second swing arm 50, due to turning of the crank pin 17, it engages with the guide groove of the second swing arm 50.

Lock Member

Figure 10:
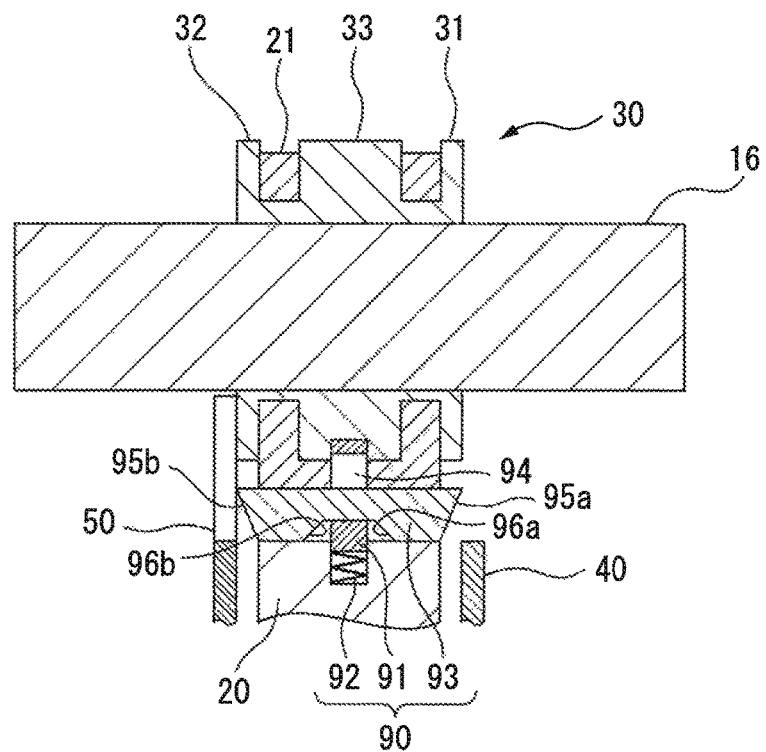
FIG. 10 is a schematic partial cross-sectional view of the variable compression ratio mechanism along the line C-C of FIG. 3.

FIG. 10 is a schematic partial cross-sectional view of the variable compression ratio mechanism 1 along the line C-C of FIG. 3. The variable compression ratio mechanism 1 is further provided with the lock member 90 configured so as to lock against turning of the eccentric member 30 when the eccentric member 30 is not engaged with the swing member. The lock member 90 includes the lock pin 91, lock pin biasing member 92, and slide member 93.

The lock pin 91 has a columnar shape and is inserted into the lock hole 35 of the eccentric member 30 to lock against turning of the eccentric member 30. The lock pin biasing member 92 biases the lock pin 91 toward the eccentric member 30. In the present embodiment, the lock pin biasing member 92 is a compression coil spring. The lock pin 91 and lock pin biasing member 92 are arranged inside the connecting rod 20.

The lock pin 91 is formed with a slit 94 for passing the slide member 93. Further, the connecting rod 20 is formed with a through hole for passing the slide member 93. The slit 94 and through hole extend in the thickness direction of the connecting rod 20. The slide member 93 passes through the through hole and slit 94 and extends to the outside of the connecting rod 20.

The slide member 93 has a pushed surface 95a which is pushed against by the first swing arm 40, a pushed surface 95b which is pushed against by the second swing arm 50, and pushing surfaces 96a and 96b pushing against the lock pin 91. The pushed surface 95a is formed at a slant so as to be pushed to the inside of the connecting rod 20 by the first swing arm 40 when the first swing arm 40 swings. The pushing surface 96a is formed at a slant so as to push the lock pin 91 to the big end 22 side when the slide member 93 is pushed by the first swing arm 40. The pushed surface 95b is formed at a slant so as to be pushed to the inside of the connecting rod 20 by the second swing arm 50 when the second swing arm 50 swings. The pushing surface 96b is formed at a slant so as to push the lock pin 91 to the big end 22 side when the slide member 93 is pushed by the second swing arm 50.

Due to the above-mentioned configuration, when the slide member 93 is not pushed by the swing member, the lock pin 91 is inserted into the lock hole 35, while when the slide member 93 is pushed by the swing member, the lock pin 91 is pulled out from the lock hole 35. Therefore, when the slide member 93 is not being pushed by the swing member, it is possible to lock against turning of the eccentric member 30, while when the slide member 93 is being pushed by the swing member, it is possible to unlock turning of the eccentric member 30.

Operation of Variable Compression Ratio Mechanism

Figure 11:
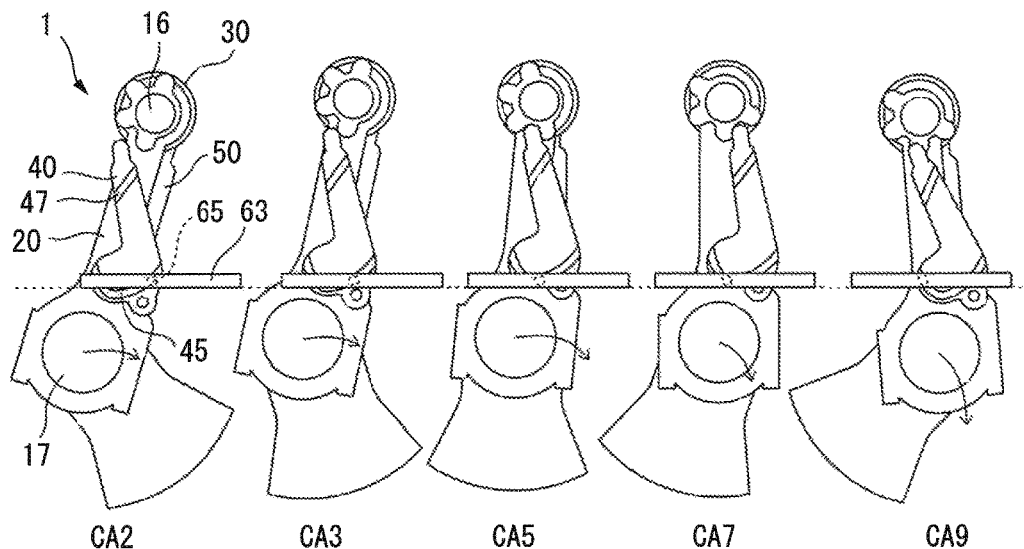
FIG. 11 is a view schematically showing the operation of the variable compression ratio mechanism when changing an effective length of a connecting rod.
Figure 11:
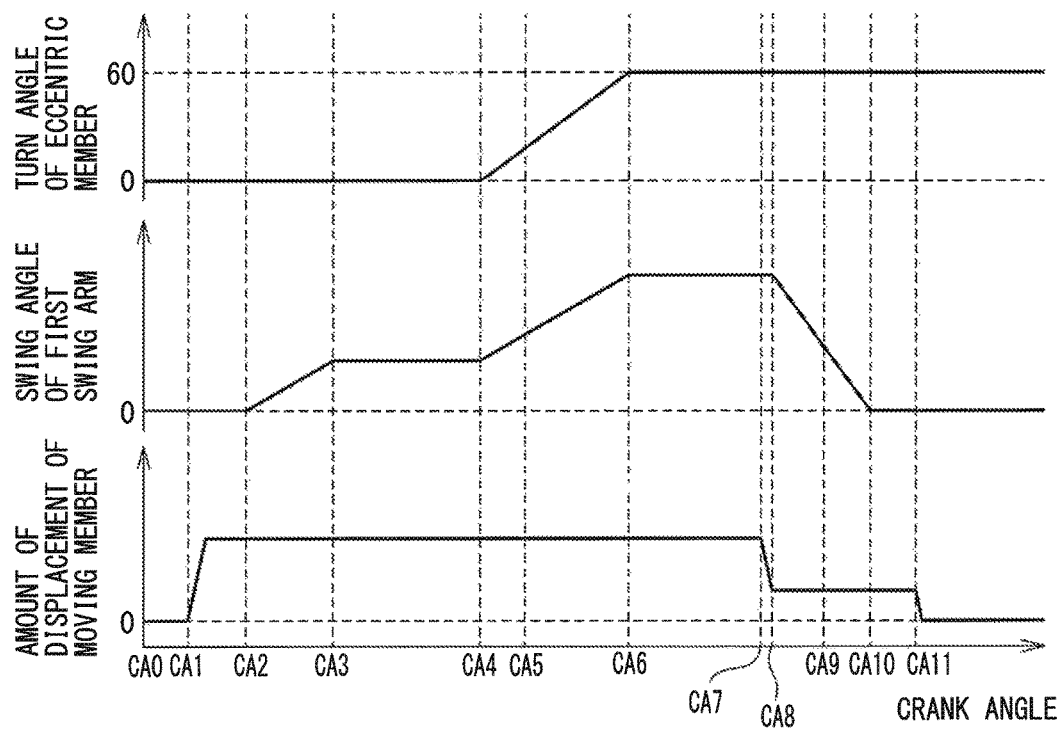
Figure 12:
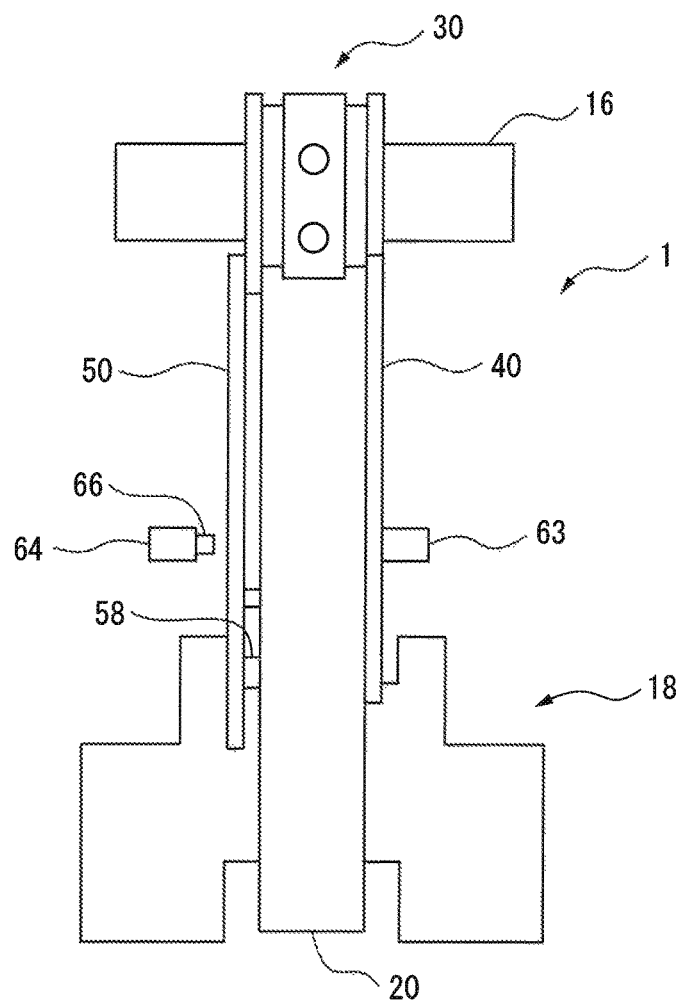
FIG. 12 is a left side view of the variable compression ratio mechanism after a moving member moves.

Below, referring to FIG. 11 to FIG. 13, the operation of the variable compression ratio mechanism 1 will be explained. FIG. 11 is a view schematically showing the operation of the variable compression ratio mechanism when changing the effective length of the connecting rod 20. In FIG. 11, the amount of displacement of the moving member 61, the swing angle of the first swing arm 40, the turn angle of the eccentric member 30, and the operation of the variable compression ratio mechanism 1 when the crank angle (rotational angle of crankshaft 18) changes are shown. The views showing the operation of the variable compression ratio mechanism 1 respectively show operation of the variable compression ratio mechanism 1 at the crank angles shown at the bottoms of the figures. In this example, due to the first swing arm 40, the eccentric member 30 is turned in one direction (counterclockwise in FIG. 11) whereby the effective length of the connecting rod 20 is made longer and in turn the mechanical compression ratio is made higher.

In the illustrated example, at the crank angle CA0, the center axial line of the piston pin receiving opening 36 is positioned at the big end 22 side. For this reason, the effective length of the connecting rod 20 is the shortest and the mechanical compression ratio is set to the lowest value. Further, the moving member 61 is at the position shown in FIG. 9. The first beam member 63 does not contact the first swing arm 40. For this reason, the first swing arm 40 is positioned at the initial position (swing angle=0°) by the biasing force of the first biasing member.

At the crank angle CA1, the moving member 61 is moved toward the first swing arm 40 by the control member 62. As a result, the first beam member 63 pushes against the first swing arm 40 and makes the first swing arm 40 abut against the connecting rod 20. At this time, the first swing arm 40 is positioned in the thickness direction of the connecting rod 20 at the same position as the projections 34 of the eccentric member 30. FIG. 12 is a left side view of the variable compression ratio mechanism 1 after the moving member 61 moves. Note that, in FIG. 12, the first guide pin 65 of the moving member 61 is offset from the first swing arm 40 in the width direction of the connecting rod 20.

After the crank angle CA1, along with turning of the crank pin 17, the first swing arm 40 approaches the first guide pin 65. FIG. 11 shows by arrows the turning direction of the crank pin 17 turning about the axial line of the crankshaft 18. The guide groove 45 of the first swing arm 40 is formed so as to engage with the first guide pin 65 when the crank pin 17 is turning. For this reason, at the crank angle CA2, the first guide pin 65 is engaged with the guide groove 45.

After that, the first guide pin 65 engaged with the guide groove 45 is guided by the guide groove 45. From the crank angle CA2 to the crank angle CA3, the first guide pin 65 moves inside the guide groove 45 while contacting the side walls of the guide groove 45 and gives rotational moment to the first swing arm 40. As a result, the first swing arm 40 swings against the biasing force of the first biasing member around the first fulcrum pin 48 from the initial position toward the stop position. At this time, the first swing arm 40 pushes the slide member 93 of the lock member 90 and unlocks turning of the eccentric member 30.

Figure 13:
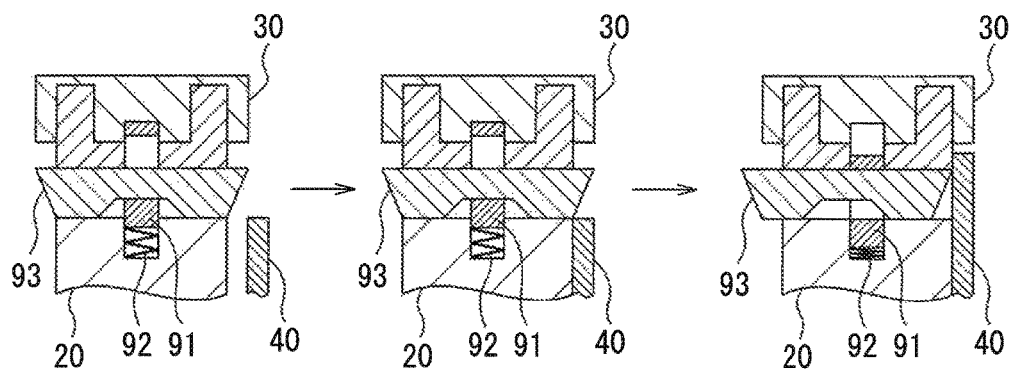
FIG. 13 is a view schematically showing a situation where the first swing arm unlocks the turning of the eccentric member.

FIG. 13 is a view schematically showing the situation where the first swing arm 40 unlocks the turning of the eccentric member 30. FIG. 13 is a cross-sectional view of the same plane as FIG. 10. When the first beam member 63 is not pushing against the first swing arm 40, the first swing arm 40 does not push against the slide member 93. After that, if the first beam member 63 pushes against the first swing arm 40, the first swing arm 40 abuts against the connecting rod 20. However, at this time, the first swing arm 40 is offset from the slide member 93 in the width direction of the connecting rod 20, so the slide member 93 is not pushed against. After that, if the first swing arm 40 swings due to the first guide pin 65, the first swing arm 40 pushes against the slide member 93 to move it to the inside of the connecting rod 20. When the slide member 93 moves to the inside of the connecting rod 20, the lock pin 91 is moved to the big end 22 side against the biasing force of the lock pin biasing member 92. As a result, the lock pin 91 is pulled out from the lock hole 35 and the turning of the eccentric member 30 is unlocked.

If referring again to FIG. 11, between the crank angle CA2 and the crank angle CA3, turning of the eccentric member 30 is unlocked. After that, at the crank angle CA3, the engaging part 42 of the first swing arm 40 engages with the projections 34 of the eccentric member 30. From the crank angle CA3 to the crank angle CA4, the first guide pin 65 moves inside the guide groove 45, but no rotational moment is given to the first swing arm 40. For this reason, the swing angle of the first swing arm 40 and the turn angle of the eccentric member 30 do not increase.

After that, from the crank angle CA4 to the crank angle CA6, the first guide pin 65 moves inside the guide groove 45. At this time, a rotational moment is given to the first swing arm 40. As a result, the first swing arm 40 swings about the first fulcrum pin 48 toward the stop position and turns the eccentric member 30. FIG. 11 shows a view of the variable compression ratio mechanism 1 at the crank angle CA5 between the crank angle CA4 and the crank angle CA6.

At the crank angle CA6, the first swing arm 40 reaches the stop position and the turn angle of the eccentric member 30 becomes 60°. As a result, the projection 34 and lock hole 35 positioned at the same circumferential direction as the lock pin 91 are switched. Due to this, the center axial line of the piston pin receiving opening 36 moves to the small end 21 side, the effective length of the connecting rod 20 is made longer, and the mechanical compression ratio of the internal combustion engine 100 is made higher.

Further, at the crank angle CA6, the first swing arm 40 is shifted from the slide member 93 in the width direction of the connecting rod 20. As a result, between the crank angle CA6 and the crank angle CA7, the slide member 93 is returned to its original position by the lock pin 91 and the lock pin 91 is inserted into the lock hole 35.

After that, at the crank angle CA7, the moving member 61 is moved so as to separate from the first swing arm 40 by the control member 62. As a result, due to the biasing force of the fulcrum pin biasing member 86, the first swing arm 40 moves so as to separate from the connecting rod 20 whereby the first swing arm 40 and the eccentric member 30 are disengaged. Further, the amount of displacement of the moving member 61 at the crank angle CA7 is smaller than the amount of displacement of the moving member 61 at the crank angle CA1. For this reason, by movement of the moving member 61, the first swing arm 40 and the eccentric member 30 are disengaged, but the first guide pin 65 and the guide groove 45 are kept engaged.

At the crank angle CA8, when the movement of the moving member 61 is finished and the eccentric member 30 and first swing arm 40 are disengaged, due to the biasing force of the first biasing member, the first swing arm 40 swings from the stop position toward the initial position. At the crank angle CA10, the first swing arm 40 returns to the initial position. FIG. 11 shows a view of the variable compression ratio mechanism 1 at the crank angle CA9 between the crank angle CA8 and the crank angle CA10.

Between the crank angle CA8 and the crank angle CA10 as well, the first guide pin 65 is guided by the guide groove 45. Therefore, the first swing arm 40 returns from the stop position to the initial position in the state where the first guide pin 65 engages with the guide groove 45. Further, the guide groove 45 is formed so as to reduce the biasing force of the first biasing member when the first swing arm 40 returns from the stop position to the initial position. That is, when the first swing arm 40 returns from the stop position to the initial position, the first guide pin 65 gives a rotational moment in the opposite direction from the rotational moment due to the first biasing member to the first swing arm 40. For this reason, the swing speed when the first swing arm 40 returns to the initial position is reduced. Note that, the rotational moment due to the first guide pin 65 is smaller than the rotational moment due to the first biasing member.

After that, at the crank angle CA11, the moving member 61 is moved to its original position (position at crank angle CA0) by the control member 62. Due to this, after the change of the effective length of the connecting rod 20, the first guide pin 65 is prevented from striking the first swing arm 40 or engaging with the guide groove 45 due to turning of the crank pin 17.

If, like in the present embodiment, there are four cylinders 15, four crank pins 17 are arranged two by two at a 180° phase difference. For this reason, due to the operation shown in FIG. 11, it is possible to simultaneously increase the effective lengths of two connecting rods 20 linked to the same phase crank pins 17. Further, at this time, at the other two connecting rods 20, due to the first beam members 63, the first swing arms 40 abut against the connecting rods 20, but the first guide pins 65 pass through the pin passing grooves 47 and do not engage with the guide grooves 45. By moving the moving members 61 at a crank angle 180° off from the crank angle CA1, it is possible to simultaneously increase the effective lengths of the other two connecting rods 20. At this time, in connecting rods 20 where the effective lengths are not changed, the first guide pins 65 pass through the pin passing grooves 47 and do not engage with the guide grooves 45. Therefore, even when, like in the present embodiment, moving the moving members 61 provided around the connecting rods 20 integrally, it is possible to change the effective lengths of the connecting rods 20.

When further raising the mechanical compression ratio of the internal combustion engine 110 after changing the mechanical compression ratio, the operation shown in FIG. 11 is again performed. On the other hand, when lowering the mechanical compression ratio, the moving member 61 is moved toward the second swing arm 50 and the second swing arm 50 turns the eccentric member 30 in the other direction (clockwise in FIG. 11). As a result, the effective length of the connecting rod 20 is made shorter and the mechanical compression ratio is lowered. Note that, when the mechanical compression ratio is made the lowest (initial state in FIG. 11), the second swing arm 50 is not made to swing. On the other hand, when the mechanical compression ratio is made the highest, the first swing arm 40 is not made to swing.

Note that, the moving members 61 of the actuating member 60 may move independently. In this case, the frame member 67 links the first beam members 63 and second beam members 64 of the moving members 61. The moving members 61 are not connected with each other. Further, one control, member 62 is provided for each moving member 61. Therefore, when moving the moving members 61 independently, it is possible to move the individual moving members 61 at their optimum timings, so the pin passing grooves 47 of the first swing arms 40 are not necessary.

Further, the depth of the guide groove 45 may be made gradually shallower along the route of the first guide pin 65 so that when the first guide pin 65 passes through the guide groove 45, the bottom of the guide groove 45 pushes the first guide pin 65 in the thickness direction of the connecting rod 20. In this case, the guide groove 45 is formed so that after the lock pin 91 is inserted into the lock hole 35, the eccentric member 30 and first swing arm 40 are disengaged and so that when the first guide pin 65 passes the guide groove 45, the moving member 61 returns to its original position.

Actions and Effects in First Embodiment

In the present embodiment, due to the swinging of the swing member, the effective length of the connecting rod 20 and in turn the mechanical compression ratio of the internal combustion engine 100 are mechanically changed. The swinging time of the swing member slightly fluctuates depending on the engine speed of the internal combustion engine 100 etc., but the amount of fluctuation is extremely small. For this reason, in the present embodiment, it is possible to reduce the variation in response time when changing the mechanical compression ratio of the internal combustion engine 100.

In this regard, if the piston 5 moves back and forth in the cylinder 15 of the internal combustion engine 100, an inertial force acts on the piston pin 16. Further, if an air-fuel mixture is burned in the combustion chamber 7, an explosive force acts on the piston pin 16. As a result, a rotational moment acts on the eccentric member 30 and the eccentric member 30 is liable to mistakenly turn. As opposed to this, in the present embodiment, when the eccentric member 30 does not engage with the swing member, the lock member 90 locks against turning of the eccentric member 30. For this reason, mistaken operation of the eccentric member 30 can be suppressed.

Further, when the swing member returns from the stop position to the initial position due to the biasing force of the first biasing member, the swing member strikes the connecting rod 20 and impact noise is generated. As opposed to this, in the present embodiment, when the first swing arm 40 returns from the stop position to the initial position, due to the first guide pin 65 and guide groove 45, the biasing force of the first biasing member is reduced and the swing speed of the first swing arm 40 is reduced. For this reason, the impact noise generated when the swing member returns from the stop position to the initial position can be reduced. Further, wear and breakage of the swing member can be suppressed.

Further, to set a mechanical compression ratio corresponding to the operating state of the internal combustion engine 100, the mechanical compression ratio is preferably made one changeable in three or more stages. As opposed to this, in the present embodiment, there are four projections of the eccentric member 30 engaging with the swing member. For this reason, it is possible to change the mechanical compression ratio of the internal combustion engine 100 in four stages. Note that, the number of projections of the eccentric member 30 may be the other number of three or more. Further, when changing the mechanical compression ratio in two stages, the number of projections of the eccentric member 30 is made two.

Further, in the present embodiment, the moving members 61 provided around the connecting rods 20 move integrally. Due to this, there is no need to separately control the moving members 61, so the configuration of the actuating member 60 and in turn the configuration of the variable compression ratio mechanism 1 can be simplified. Note that, when moving the moving members 61 integrally, there are two or more connecting rods 20 provided at the internal combustion engine 100.

Second Embodiment

The variable compression ratio mechanism according to a second embodiment is basically similar to the variable compression ratio mechanism according to the first embodiment except for the points explained below. For this reason, below, the second embodiment of the present invention will be explained focusing on the parts different from the first embodiment.

Figure 14:
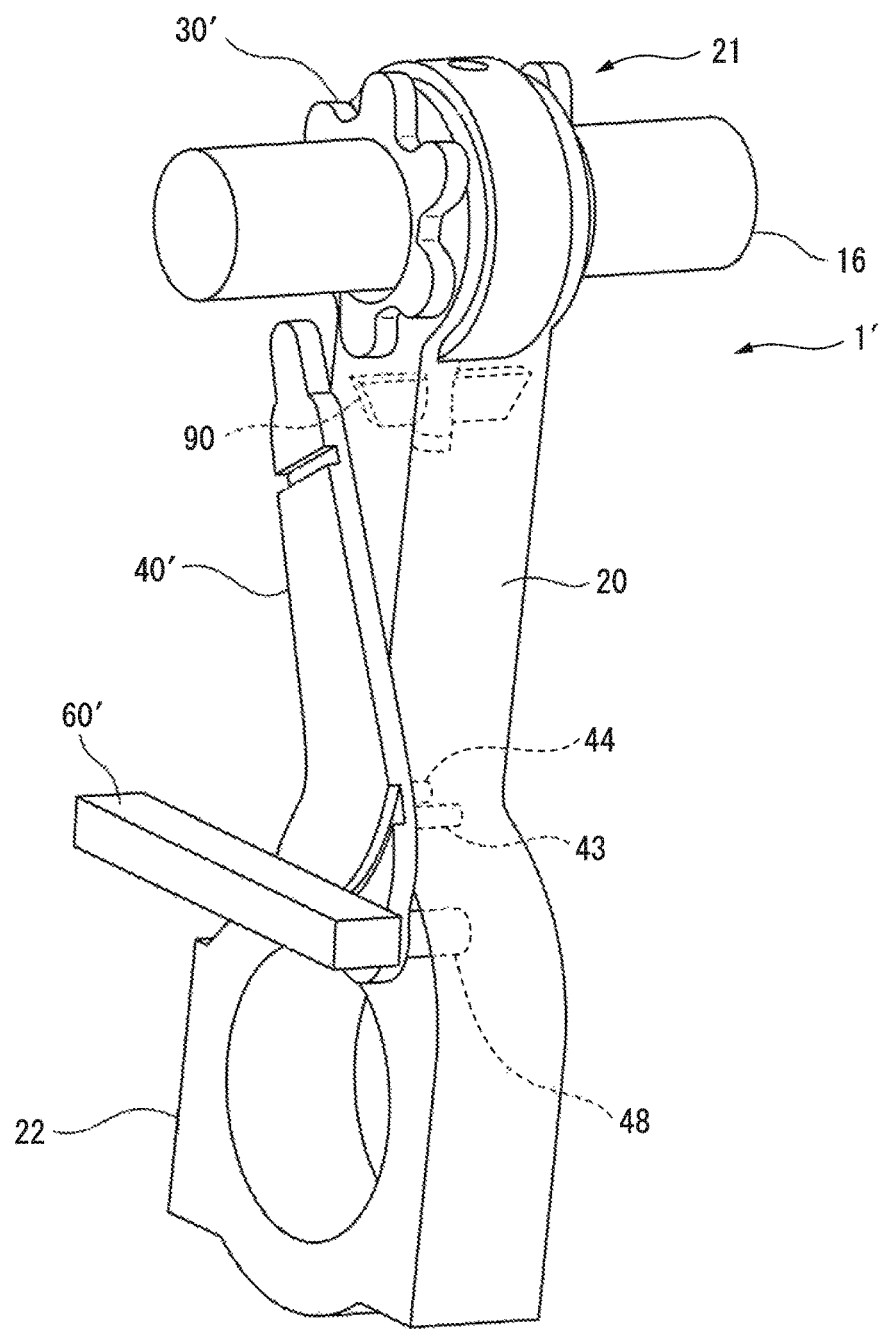
FIG. 14 is a perspective view schematically showing a variable compression ratio mechanism according to a second embodiment of the present invention.

FIG. 14 is a perspective view schematically showing a variable compression ratio mechanism 1' according to the second embodiment of the present invention. In the same way as the first embodiment, the variable compression ratio mechanism 1' is provided with a connecting rod 20, an eccentric member 30' attached to the connecting rod 20 to be able to turn, a swing member attached to the connecting rod 20 to be able to swing, an actuating member 60' configured to swing the swing member, and a lock member 90 configured to lock against turning of the eccentric member 30'. In the second embodiment, the swing member is comprised of a single swing arm 40' configured so as to turn the eccentric member 30' in one direction. For this reason, the configuration of the variable compression ratio mechanism 1' can be made simpler. Note that, the swing arm 40' has a shape similar to the first swing arm 40 in the first embodiment.

Eccentric Member

Figure 15:
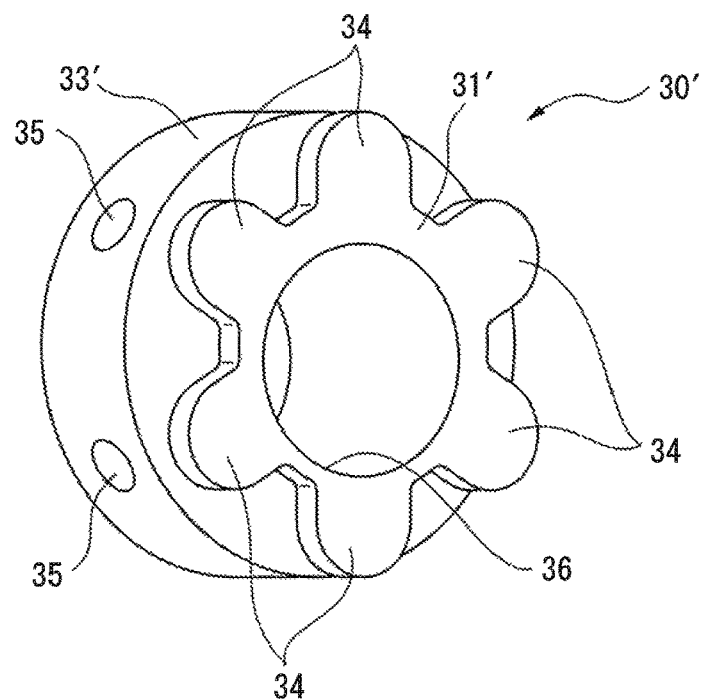
FIG. 15 is a perspective view of an eccentric member.
Figure 16:
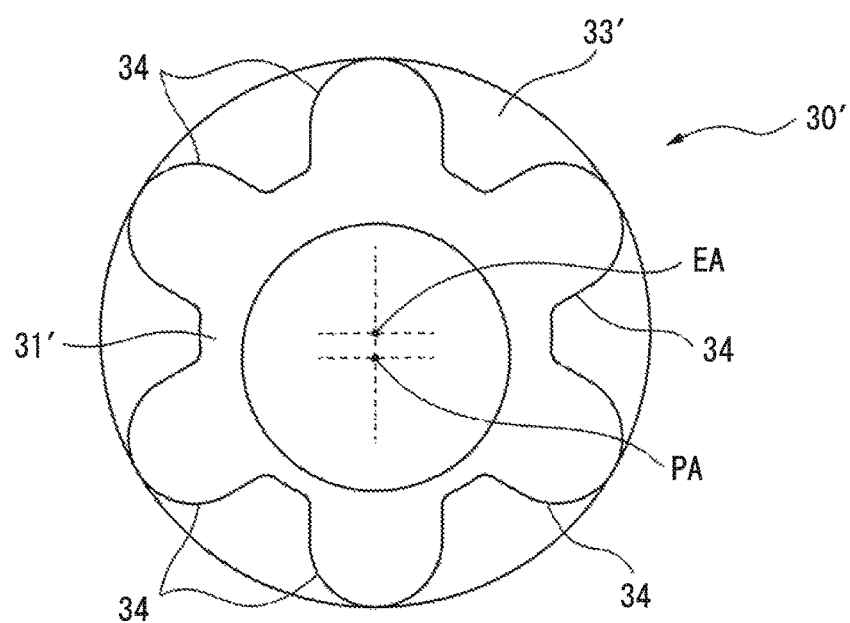
FIG. 16 is a front view of the eccentric member.

FIG. 15 is a perspective view of the eccentric member 30', while FIG. 16 is a front view of the eccentric member 30'. The eccentric member 30' includes an engaged part 31' and a lock part 33' adjoining the engaged part 31'. The eccentric member 30' is provided with a piston pin receiving opening 36 receiving a piston pin 16. The piston pin receiving opening 36 is formed into a cylindrical shape and runs through the eccentric member 30' in its axial direction.

The engaged part 31' has six projections 34. The six projections 34, respectively, extend from the piston pin receiving opening 36 outward in the diametrical direction. The tips of the projections 34 are rounded. The projections 34 are arranged at the outside of the connecting rod 20 in the thickness direction of the connecting rod 20. The projections 34 engage with the swing arm 40'. As will be understood from FIG. 16, the projections 34 are arranged at equal intervals around the axial line EA of the eccentric member 30'. In this example, the intervals of the projections are 60°. Further, the projections 34 are arranged over the entire outer circumference of the eccentric member 30'. The engaged part 31' is connected with the lock part 33' in the axial direction of the eccentric member 30'. The connecting part of the engaged part 31' with the lock part 33' is received in the eccentric member receiving opening of the connecting rod 20.

The lock part 33' has a cylindrical shape. The lock part 33' is inserted into the small end 21 of the connecting rod 20. The lock part 33' is formed with six lock holes 35. The six lock holes 35, respectively, extend from the outer surface of the lock part 33' to the inside in the diametrical direction. The lock holes 35 are arranged in the circumferential direction of the eccentric member 30' at the same positions as the projections 34. The lock pins 91 of the lock member 90 are inserted into the lock holes 35.

Actuating Member

Figure 17:
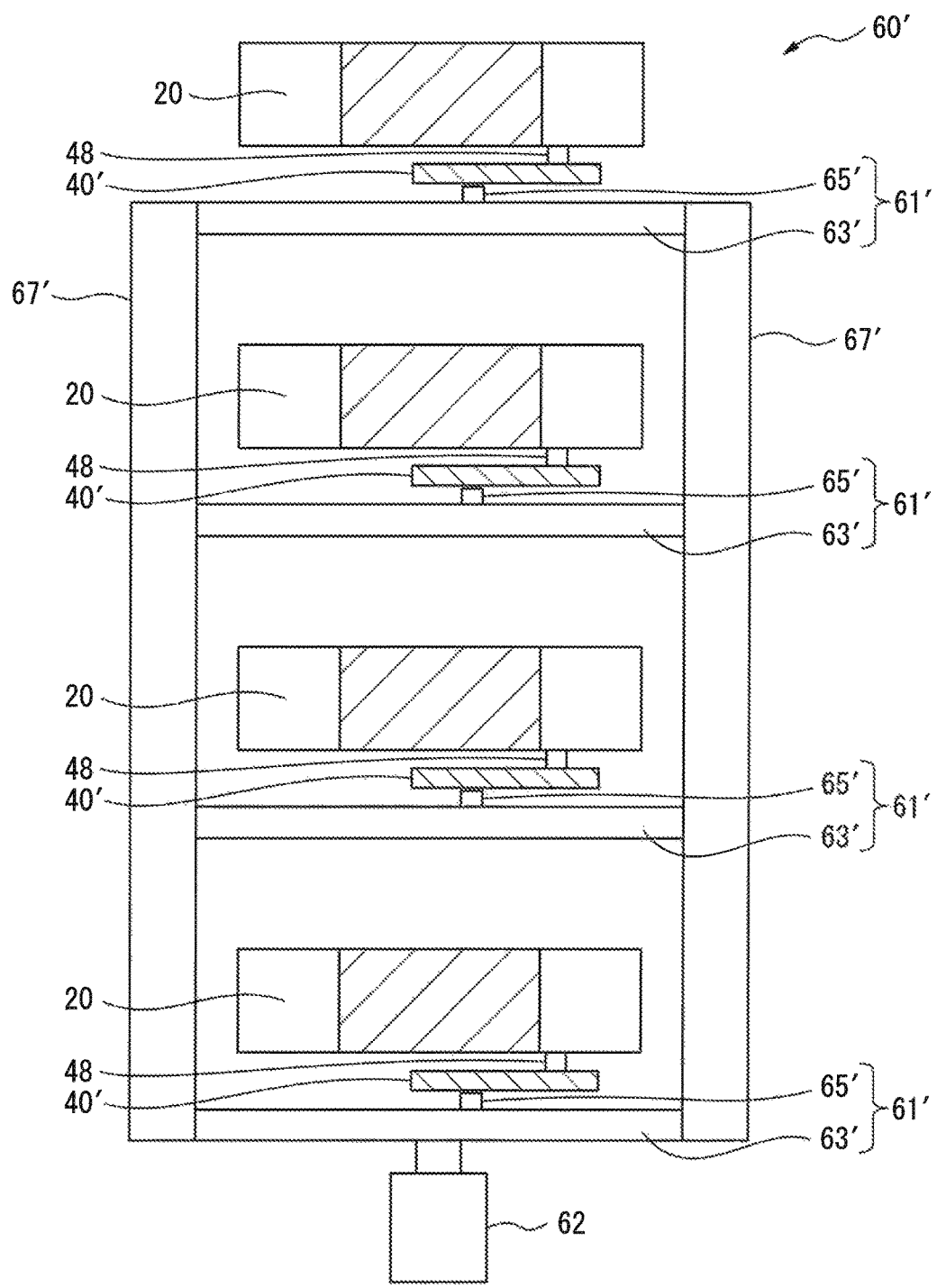
FIG. 17 is a schematic cross-sectional view of the variable compression ratio mechanism similar to FIG. 9.

FIG. 17 is a schematic cross-sectional view of the variable compression ratio mechanism 1' similar to FIG. 9. The actuating member 60' includes moving members 61' and a control member 62 controlling the movements of the moving members 61'. The moving member 61' moves between a contact position contacting the swing member and a noncontact position not contacting the swing member. The moving member 61' includes a beam member 63' and a guide pin 65' extending from the beam member 63' toward the swing arm 40'. The moving members 61' are provided around the connecting rods 20 and are connected with each other by a frame member 67'. For this reason, the moving members 61' provided around the connecting rods 20 move integrally.

If the beam members 63' are moved by the control member 62 toward the swing arms 40', the swing arms 40' are pushed toward the connecting rods 20. If the guide pins 65' are moved by the control member 62 toward the swing arms 40', due to rotation of the crankshaft 18, they are engaged with the guide grooves 45 of the swing arms 40'.

Operation of Variable Compression Ratio Mechanism

Figure 18:
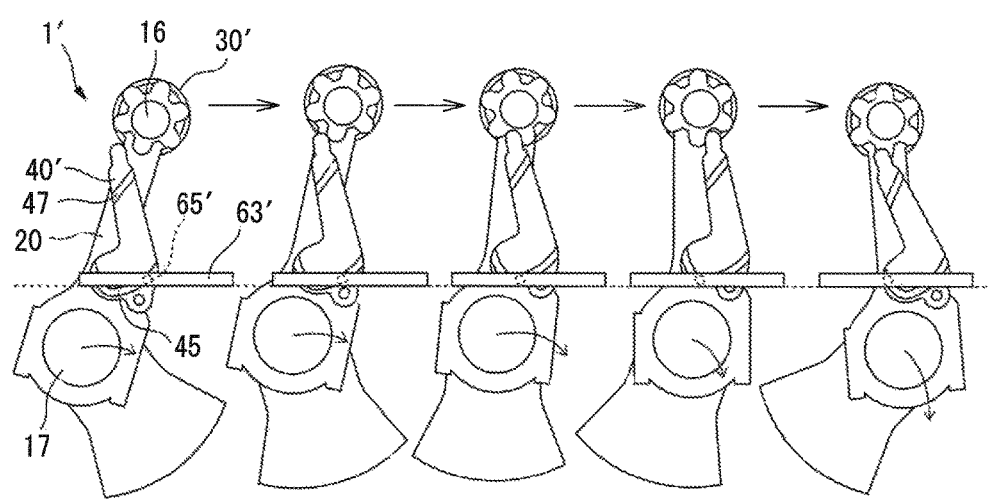
FIG. 18 is a view schematically showing the operation of the variable compression ratio mechanism when changing the effective length of the connecting rod.

FIG. 18 is a view schematically showing the operation of the variable compression ratio mechanism 1' when changing the effective length of the connecting rod 20. In this example, the eccentric member 30' is turned in one direction (counterclockwise in FIG. 18) by the swing arm 40', whereby the effective length of the connecting rod 20 is made longer. As will be understood from FIG. 18, in the second embodiment as well, the effective length of the connecting rod 20 is made longer in the same way as the first embodiment.

Figure 19:
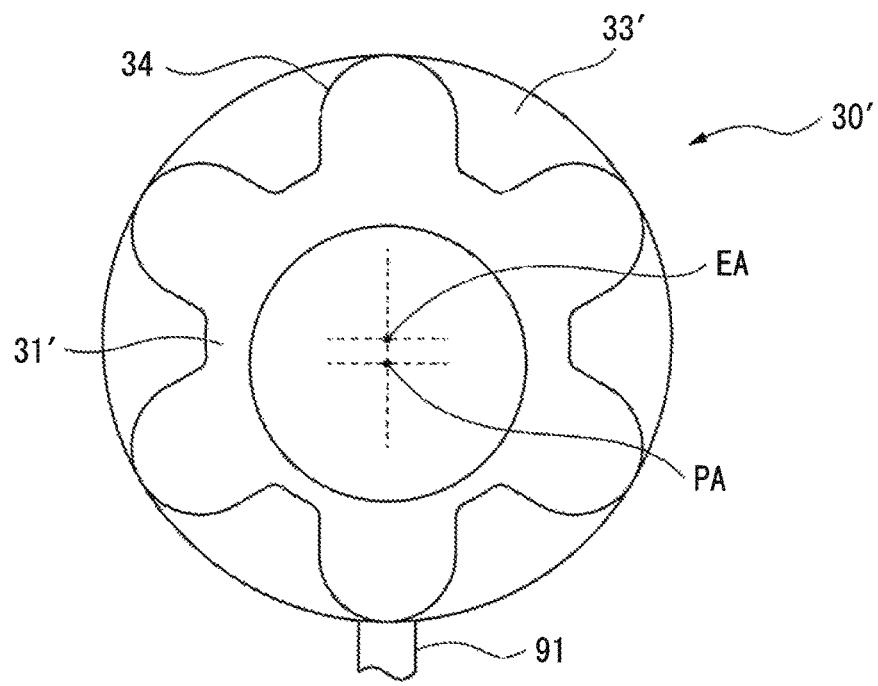
FIG. 19 is a view showing two states of the eccentric member in the second embodiment.
Figure 19:
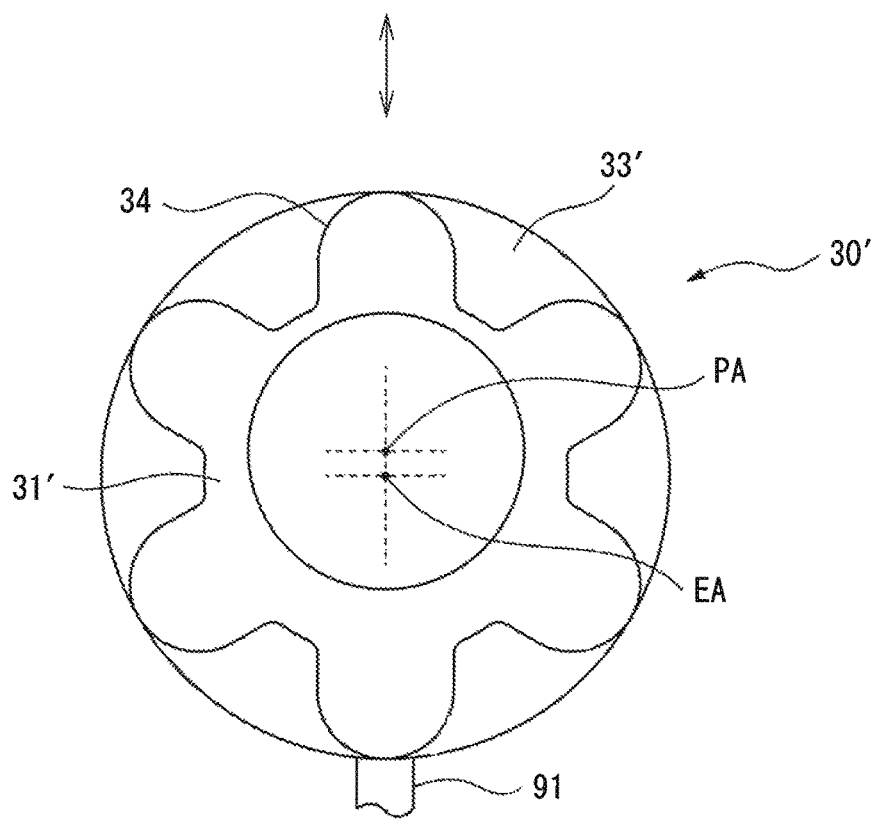

However, in the second embodiment, the eccentric member 30' is not turned in the other direction (clockwise in FIG. 18). For this reason, in the second embodiment, the mechanical compression ratio of the internal combustion engine is changed in two stages, while the eccentric member 30' is switched between two states shown in FIG. 19. In FIG. 19, the lower side eccentric member 30' shows the state of a high compression ratio, while the upper side eccentric member 30' shows the state of a low compression ratio. The mechanical compression ratio is switched by repeating the operation shown in FIG. 18 three times. For this reason, in the second embodiment as well, due to the swinging of the swing member, the effective length of the connecting rod 20 and in turn the mechanical compression ratio of the internal combustion engine are mechanically changed. Therefore, it is possible to reduce the variation in response time when changing the mechanical compression ratio of the internal combustion engine.

Note that, in the same way as the first embodiment, the moving members 61' of the actuating member 60' may be able to independently move. In this case, the frame member 67' is not necessary and one control member 62 is provided for each moving member 61'. Therefore, when moving the moving members 61' independently, it is possible to move the individual moving members 61 at their optimum timings, so the pin passing groove 47 of the swing arm 40' is not necessary.

Further, the eccentric member 30' and swing arm 40' may have gear structures such as shown in for example PLT 3, and the eccentric member 30' may be turned 180° by one swing operation of the swing arm 40'. In this case, one swing operation of the swing arm 40' enables the mechanical compression ratio to be switched. Further, while the eccentric member 30' is not engaged with the swing arm 40', it is possible to place the center axial line PA of the piston pin receiving opening 36 on the axial line of the connecting rod 20. In this case, even if inertial force and explosive force act on the piston pin 16, almost no rotational moment will be generated causing the eccentric member 30' to turn. For this reason, the lock member 90 may be omitted.

Above, preferred embodiments of the present invention were explained, but the present invention is not limited to these embodiments and can be modified and changed in various ways within the language of the claims.

REFERENCE SIGNS LIST 1, 1'. variable compression ratio mechanism
16. piston pin
17. crank pin
20. connecting rod
23. crank receiving opening
30, 30'. eccentric member
36. piston pin receiving opening
40. first swing arm
40'. swing arm
50. second swing arm
60, 60'. actuating member
100. internal combustion engine

The invention claimed is:

1. A variable compression ratio mechanism able to change a mechanical compression ratio of an internal combustion engine, comprising:
  a connecting rod provided with a crank receiving opening receiving a crank pin;
  an eccentric member provided with a piston pin receiving opening receiving a piston pin and attached to the connecting rod to be able to turn so as to change a length between a center axial line of the piston pin receiving opening and a center axial line of the crank receiving opening;
  a swing member attached to the connecting rod to be able to swing and able to engage with the eccentric member; and
  an actuating member configured so as to swing the swing member from an initial position toward a stop position, wherein the swing member engages with the eccentric member to turn the eccentric member when swinging from the initial position toward the stop position, and returns from the stop position to the initial position when disengaged form the eccentric member.

2. The variable compression ratio mechanism according to claim 1, wherein the swing member is comprised of a first swing arm configured so as to turn the eccentric member in one direction and a second swing arm configured so as to turn the eccentric member in the other direction.

3. The variable compression ratio mechanism according to claim 2, wherein the eccentric member has three or more projections engaging with the swing member, and the mechanical compression ratio of the internal combustion engine is changed in three or more stages.

4. The variable compression ratio mechanism according to claim 1, wherein the swing member is comprised of a single swing arm configured so as to turn the eccentric member in one direction.

5. The variable compression ratio mechanism according to claim 1, further comprising a lock member configured so as to lock against turning of the eccentric member when the eccentric member is not engaged with the swing member.

6. The variable compression ratio mechanism according to claim 5, wherein the swing member contacts the lock member to unlock turning of the eccentric member when swinging from the initial position toward the stop position.

7. The variable compression ratio mechanism according to claim 1, wherein the swing member is formed with a guide groove, the actuating member includes a guide pin, and when the crank pin turns, the guide pin engages with the guide groove and is guided in the guide groove to swing the swing member from the initial position to the stop position.

8. The variable compression ratio mechanism according to claim 7, further comprising a biasing member biasing the swing member from the stop position toward the initial position,
wherein the swing member returns from the stop position to the initial position in the state with the guide pin engaged with the guide groove when disengaged from the eccentric member, and
the guide groove is formed so as to reduce a biasing force of the biasing member when the swing member returns from the stop position to the initial position.

9. The variable compression ratio mechanism according to claim 1, wherein the actuating member includes a moving member moving between a contact position contacting the swing member and a noncontact position not contacting the swing member, and a control member controlling movement of the moving member.

10. The variable compression ratio mechanism according to claim 9, wherein there are two or more connecting rods and moving members, each moving member is provided around each connecting rods, and the moving members move integrally.

11. An internal combustion engine provided with a variable compression ratio mechanism according to claim 1.

\* \* \* \* \*